May 19, 1925.  1,538,357
S. SCHIFF
DUST COLLECTOR
Filed March 11, 1921   2 Sheets-Sheet 1
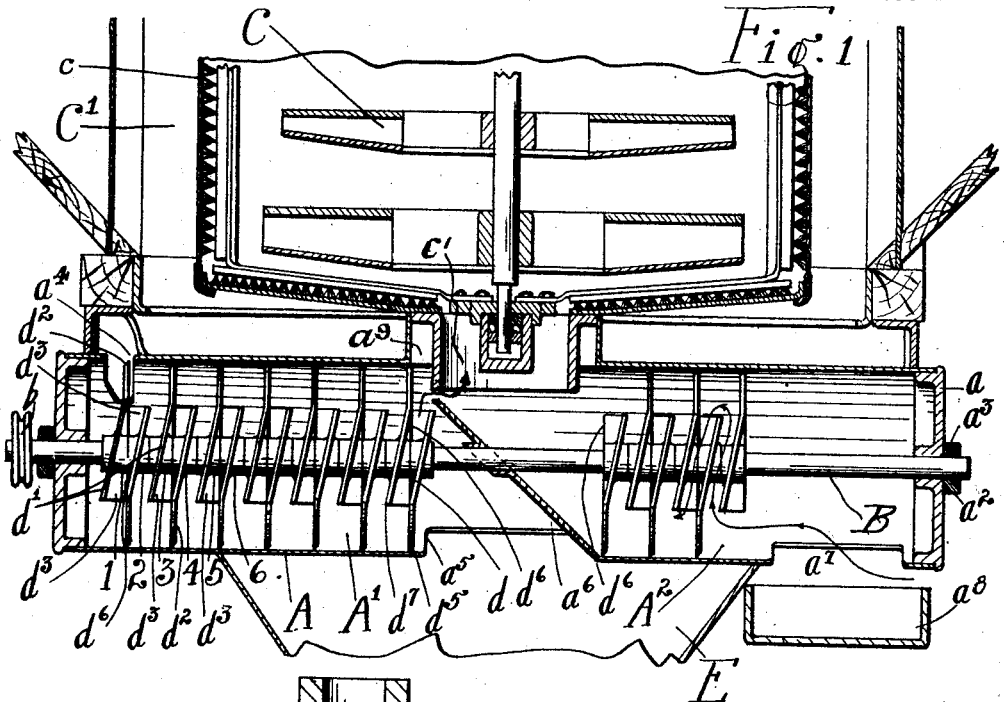
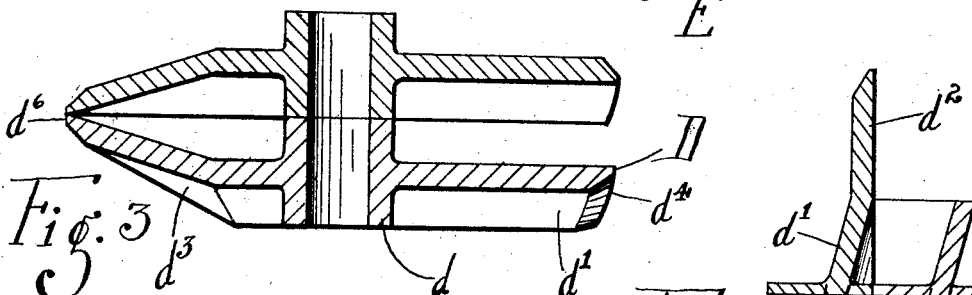
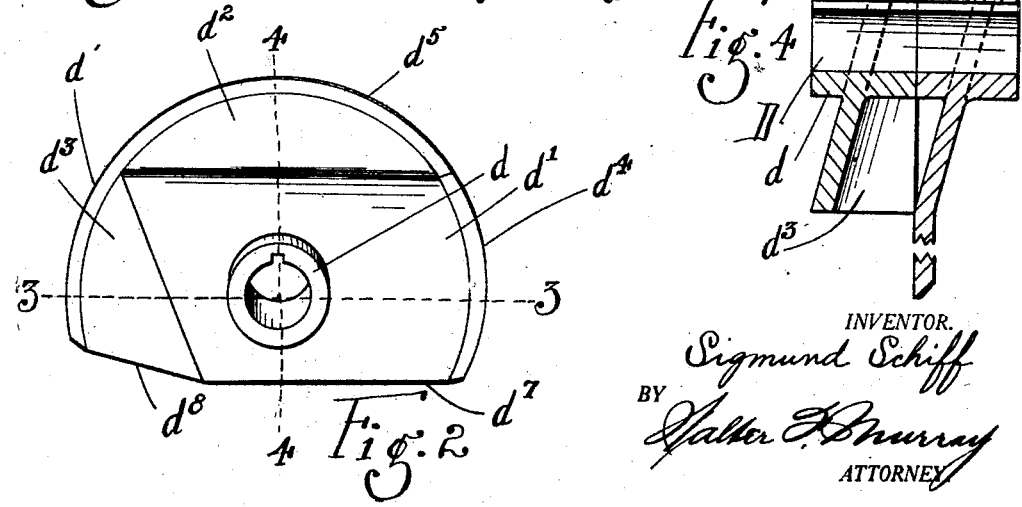
INVENTOR.
Sigmund Schiff
BY
Walter F. Murray
ATTORNEY

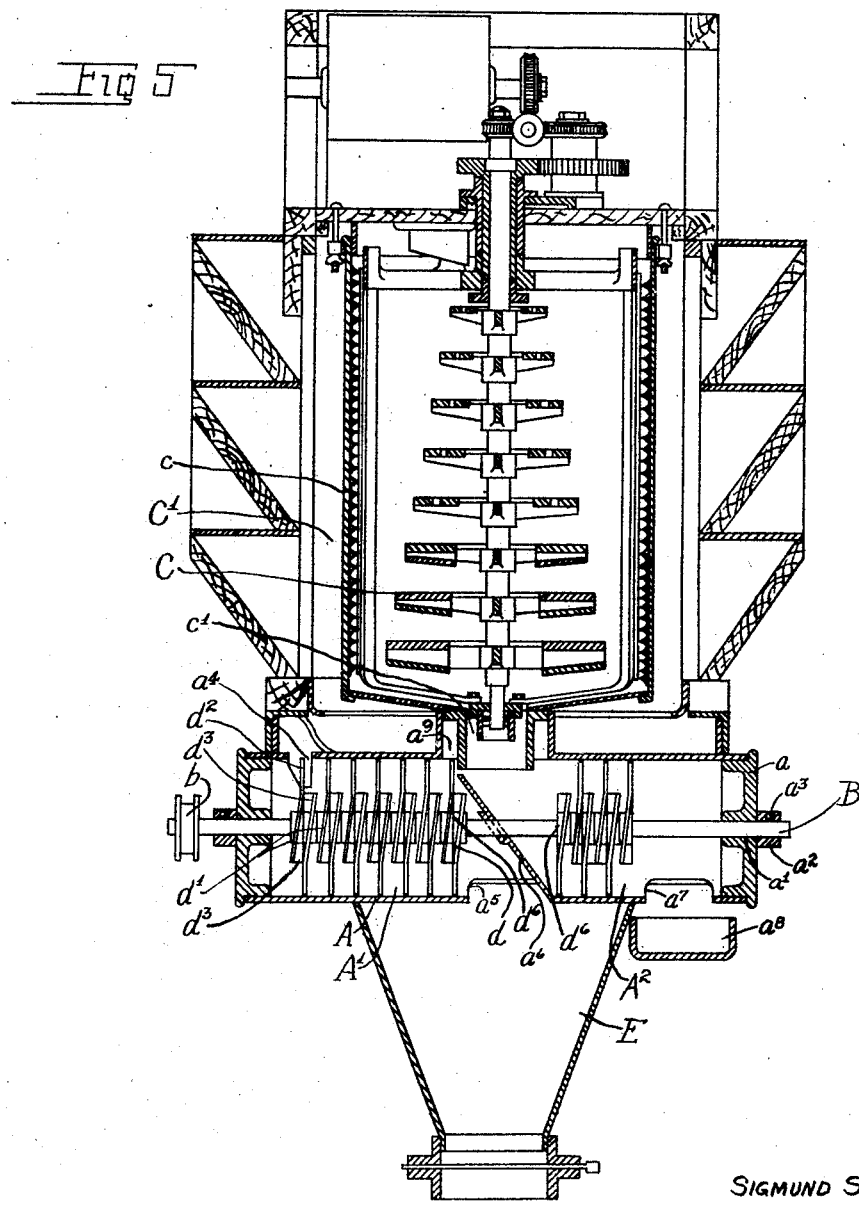

Patented May 19, 1925.

1,538,357

UNITED STATES PATENT OFFICE.

SIGMUND SCHIFF, OF CINCINNATI, OHIO.

DUST COLLECTOR.

Application filed March 11, 1921. Serial No. 451,517.

*To all whom it may concern:*

Be it known that I, SIGMUND SCHIFF, an applicant for citizenship in the United States of America, and resident of Cincinnati, in the county of Hamilton and State of Ohio, have invented a new and useful Improvement in a Dust Collector, of which the following is a specification.

An object of my invention is to provide a dust collector adapted to be used with sifting mechanisms, and which has a maximum of efficiency.

Another object is to provide a device of the type referred to, that is simple in construction, application and operation, and which has a minimum of movable parts.

Another object is to provide a device for the purposes stated, in which a circuitous passage is provided at all times for the dust-laden air, and which will automatically remove the collected dust without modifying said circuitous passage.

These and other objects are attained by the means described herein and disclosed in the accompanying drawings, in which:—

Fig. 1, is a transverse sectional view of a device embodying my invention mounted upon a sifting mechanism.

Fig. 2, is an enlarged perspective view of one of the disks forming a detail of my invention.

Fig. 3, is an enlarged sectional view on line 3—3 of Fig. 2.

Fig. 4, is an enlarged sectional view on line 4—4 of Fig. 2.

Fig. 5 is a transverse sectional view similar to Fig. 1, and showing a dust collector embodying my invention associated with a sifting mechanism of the type disclosed in my co-pending application Serial No. 380,893.

My invention is of a dust collector adapted to be employed in cooperation with sifting mechanisms such as shown in my co-pending application, Serial No. 380,893. This device may be used with other types and kinds of sifters but for the purpose of brevity it is shown attached to a sifter such as disclosed in the aforesaid application.

My invention comprises a hollow cylindrical tube or pipe A, centrally within which is mounted a revoluble shaft B, having mounted upon it a series of disks D, which together form a sinuous or serpentine passage thru the pipe and thru which passage the dust laden air must pass. Te disks are adapted also to move the precipitated and collected dust to a position wherefrom it falls into a hopper. In another part of the pipe or housing, I employ similar disks for the purpose of removing the tailings that are discharged from the sifter.

The pipe A has centrally mounted within it the revoluble shaft B. The shaft is supported by means of the caps $a$, mounted on the outer ends of the pipe and in which are formed the bearings $a'$ for the shaft B. The collars $a^2$ secured upon the shaft by means of set screws $a^3$, prevent displacement or separation of the parts. About one-half of the pipe A, together with the shaft B, extending therethru and the disks D mounted therein in such part of pipe A, comprise a dust collector A', and the other half of the pipe A, together with the shaft B and the disks D mounted thereon in such other part of the pipe A, constitutes a tailing remover. The pipe A has about midway its length, two ports $a^5$ and $a^9$, one being in the top and one in the bottom of the pipe. The dust collector has an aperture $a^4$ formed in the pipe A adjacent the outer end thereof, such aperture providing communication between the interior of the pipe A and the expansion chamber C', into which the siftable substances enter after passing thru the screen $c$ of the sifter. Such of the air as does not escape thru the expansion collector, such as shown in the aforesaid application, enters the dust collector A' by way of the entry port $a^4$ in the pipe A. The disks D, mounted upon the shaft B interiorly to the dust collector section of the pipe, provide a sinuous passage thru the pipe from the entry port $a^4$ to ports $a^5$ and $a^9$ in pipe A. The discharge opening $c'$, formed at the base of the sifter C, extends into the port $a^9$ in the pipe A. As the air passes thru this passage, it is obliged to repeatedly reverse the direction in which it moves relative to the shaft B. When the air reaches the end of the passage it passes into the sifter by way of port $a^9$ and opening $c'$. The discharge port $a^5$ is formed in the pipe A adjacent the centermost disk D of the dust collector and over the edge of which aperture said centermost disk is adapted to push the precipitated dust, which dust then falls into the hopper E disposed below the expansion chamber C' of the sifter and the dust collector. An inclined plate $a^6$ disposed within the pipe A and thru which shaft B extends, is adapted to catch the tailings discharged from the sifter by way of the discharge opening $c'$, and to direct such tailings toward the tailing remover.

The tailing remover is substantially the same in form and construction as the dust collector, and as disclosed herein, is adapted to move the tailings in the same direction in which the dust is moved. A discharge port $a^7$ is formed in the tailing remover section of the pipe A and the disks D are adapted to push the tailing toward and over the edge of the discharge port $a^7$, whereupon the tailings fall into a suitable tailing box $a^8$, provided therefor. A sinuous passage is formed between the disks D, disposed within the tailing remover section, whereby the air drawn into the sifter, by way of the tailing remover and the discharge opening $c'$, comes into contact with the tailings, and carries back into the sifter any fine dust that might have been clinging to the tailings.

The disks D comprise a hub $d$ adapted to be mounted upon the shaft B and to be secured thereto by any suitable means, such as a key. A worm or body portion $d'$ extends from the hub at an angle thereto. A wing $d^2$ is formed upon the body portion $d'$ at such an angle to the body portion that the wing extends substantially at a right angle to the hub $d$ and to the axis of the shaft on which the disk is mounted. The body section $d'$ is mutilated on the side thereof opposite the wing $d^2$, in that the outer edge of such mutilated part of the disk terminates and is disposed about midway of the radius of the disk, wherefore, when the disk is mounted within the pipe A, it is possible for air to pass the disks, altho parts of the disk engage the pipe A. The segment $d^3$ of the body section is bent at an angle to the body section so that the outer edge of such segment will be in peripheral alignment with the outer edge of the wing $d^2$. From the foregoing it will be apparent that the edge $d^4$ formed on the body section, is developed into a sweeping or pushing edge adapted to move over the pipe's inner surface any substance with which such edge comes into contact, while the edges $d^5$ formed on the wing $d^2$ and $d^6$ formed on the segment $d^3$, serve only to provide a closure for part of the bore of the pipe A. The mutilated edge $d^7$ formed on the body $d'$, and edge $d^8$, formed on the segment $d^3$, will not engage the pipe A, wherefore air may pass the disks adjacent such edges. In mounting these disks upon the shaft B interiorly to the dust collector and the tailing remover, the mutilated sections of adjacent disks are disposed upon opposite sides of the shaft B, and in such relation to one another that as each of the pushing edges $d^4$ of each disk passes over the bottom of the pipe A, such pushing edge will serve to move toward the ports $a^5$ and $a^7$ such of the substances upon the base of the pipe A with which the pushing edges of the disks come in contact. The shaft B may be revolved by such means as a pulley $b$ mounted upon one end thereof.

I have found that by forming the disks as described and shown, I can use disks that are all constructed similarly. The desired result is attained by reversing alternate disks and so disposing the disks upon the shaft B that all the disks will have their pushing edges $d^4$ in alignment, wherefore the edges $d^6$ of the segment $d^3$ of disk 1, engages edge $d^6$ of segment $d^3$ of disk 2, and the corresponding edges of disks 3 and 4, 5 and 6, etc., engage similarly, while the segments on disks 2 and 3 diverge. The segments on disks 4 and 5 diverge similarly to the segments on disks 2 and 3.

The worm or body portion $d'$ of the disks are inclined at such an angle to the hub that the pushing edge $d^4$ formed thereon is adapted to sweep over an area equal in length to the length of the hub $d$, so that each disk is adapted to move the dust on the bottom of the pipe A forwardly to such extent that on the next revolution, the adjacent disk will be able to move the dust onward to the next disk.

The operation of my device is as follows:—

When my device is used with a sifter of the type set forth in my co-pending application Serial Number 380,893, a ground substance is fed by means of a hopper and an inclined chute (not shown) into the sifter (see Fig. 1) and is disposed upon the revolving discs C. The discs C are of graduated diameters, the largest being at the bottom. The lower discs have fastened upon them fan plates which create a forced draft. This draft together with the centrifugal force of the rapidly revolving discs projects the ground substance violently against the screen $c$. The finer particles pass through the screen into an expansion chamber C', from which part of the air may escape and in which therefore, the forced draft losses much of its velocity, allowing much of the sifted substance to fall to a hopper E. Some air carrying dust in suspension, passes into the dust collector A' through the port $a^4$. The tailings or heavier portions drop from within the sifter through the opening $c'$ where such particles of siftable substance that may adhere thereto may be removed in the chamber A² and be carried back into the sifter by air entering by way of $a^7$.

After the siftable substance has passed thru the screen $c$, some of the dust-laden air will enter the pipe A by way of the port $a^4$, and will follow the sinuous passage thru the dust collector, designated by the arrow. As this air passes thru this passage, the dust will settle upon the bottom of the pipe A, so that by the time the air reaches the end of the sinuous passage beween the disks, and again enters the tailing discharge opening $c'$ by passing over the inclined plate $a^6$, there will be practically no dust carried by the air. Should any dust fail to settle in the dust collector, such dust will be carried up into the sifting device and again be sifted. As the edges $d^4$ formed on the disks pass over the surface of the pipe A, such edges move the deposit upon the bottom of the pipe A toward the discharge port $a^5$. The edge $d^4$ on each disk is adapted to move this deposit forwardly to such a position that the next adjacent disk will engage the deposit and carry it forwardly when such next adjacent disk reaches such a position that its edge $d^4$ engages the bottom of the pipe A. When the substance reaches the edge of the pipe adjacent port $a^5$, the substance falls into the hopper E.

The tailings discharged from the sifter fall thru the discharge opening $c'$ and are deflected by the inclined plate $a^6$ to the tailing remover which moves the tailings toward the discharge port $a^7$ in a manner similar to that in which the dust collector mechanism moves the precipitated dust towards port $a^5$. Due to the fact that a decided flow of air enters the sifter by way of the tailing remover, the tailings are stirred up by the current of air which carries back into the sifter, any dust that may have clung to the tailings when leaving the sifter.

The dust collector and tailing remover may be built as separate mechanisms, that may be operated independently of one another. The mechanisms may be so arranged that the dust and tailings are moved in the same or opposite directions by modifying the disks and the method of their mounting, to accomplish the desired movement of such substance.

Altho I have described my invention as operative with a sifter, it is readily possible to use same in connection with devices in which one substance is to be moved in one direction thru a given container and wherein another substance is moved thru the same container in the same or an opposite direction from the first mentioned substance.

What I claim is:—

1. In a device of the class described the combination of a tube, means within the tube for feeding material therethru and providing a geniculate air passage therethru and so positioned in relation to the tube as to be at all times unobstructed by material passing through the tube.

2. In a device of the class described the combination of a tube, a revoluble shaft extending thru the tube, and means mounted on the shaft for feeding material thru the tube and providing a geniculate air passage therethru and so positioned in relation to the tube as to be at all times unobstructed by material passing through the tube.

3. In a device of the class described the combination of a tube, a revoluble shaft extending thru the tube, and mutilated disks mounted on the shaft adapted to move material thru the tube and providing a geniculate air passage therethru said air passage being at all times unobstructed by material passing through the tube.

4. In a device of the class described the combination of a tube, a shaft extending thru the tube, means to revolve the shaft, and means mounted on the shaft adapted to provide a geniculate air passage thru the tube and to move material thru the tube and to leave the air passage unobstructed while moving material through the tube.

5. In a device of the class described the combination of a tube, a revoluble shaft extending thru the tube, disks mounted on the shaft and engaging the tube, the disks having a pushing edge and a multilated edge, the immediately adjacent disks having their mutilated edges disposed upon opposite sides of the shaft, whereby a continuous sinuous air passage is formed thru the tube, and whereby immediately adjacent disks successively move a substance thru the tube over the bottom thereof.

6. In a sifter mechanism having an expansion chamber and a tailing discharge opening, the combination of a tube, a dust collector in one end of the tube communicating with the expansion chamber and a tailing remover in the other end of the tube communicating with the tailing discharge opening.

7. In a sifter mechanism the combination with a tube, a partition dividing the tube, a combined dust collector and remover disposed within the tube on one side of the partition, a tailing remover within the tube and disposed upon the opposite side of the partition, and means to actuate the combined dust collector and remover and the tailing remover in unison.

8. In a combined dust collector and tailing remover the combination of a tube, a partition in the tube, a dust collector and a tailing remover disposed within the tube upon opposite sides of the partition, such collector and remover comprising a shaft extending thru the tube and thru the partition, disks mounted on the shaft upon opposite sides of the partition and providing circuitous passages thru the collector and remover, and adapted to move substances thru such collector and remover, and means to revolve the shaft.

9. The combination with a sifter having an expansion chamber, a tailing discharge opening, a tailing box and a hopper, a tube having inlet and discharge ports, a partition in the tube disposed so as to provide inlet ports and discharge ports upon both sides of the partition, the inlet port on one side of the tube providing communication between the sifter expansion chamber and the tube, the discharge port on said side providing communication with the sifter hopper and the sifter discharge opening, the inlet port on the other side of the partition providing communication between the sifter tailing discharge opening and the tube, and the discharge port on said other side providing communication between the tube and a tailing box, the partition being adapted to direct tailings from the tailing discharge opening to the second mentioned side of the tube, and means within the tube adapted to feed substance therethru and to provide a continuous circuitous air passage between the inlet and discharge ports on each side of the partition.

10. As a new article of manufacture, a disk having a pushing edge, a closure edge, and a mutilated edge formed thereon, the mutilated edge terminating on a chord of the disk.

11. The combination with a tube, of a disk adapted to be revolubly mounted within the tube and comprising a hub, a body section, a pushing edge formed on the body section, and a mutilated edge formed thereon, and being adapted to move a substance thru the tube during partial revolution thereof, to provide a closure between the hub and part of the tube and whereby there is formed a passage between the mutilated edge and the tube and which passage remains open at all times.

12. The combination with a tube, of a disk adapted to be revolubly mounted within the tube and comprising a hub, a body portion, a pushing edge formed on the body portion, and a mutilated edge formed thereon, the disk being adapted to be combined with a second similar disk mounted within such tube in reversed relation to the first disk, and to form therewith a sinuous passage thru the tube and which passage remains open at all times, the disks being adapted to intermittingly move a substance over the bottom of the tube.

13. In a device of the class described the combination of a revoluble shaft, disks mounted on the shaft, alternate disks being reversed, a housing enclosing the disks and the shaft, means to revolve the shaft, the disks being adapted to provide a circuitous air passage thru the housing and to intermittingly move a substance thru the housing.

14. A device of the class described comprising a conveyor having an air passage provided with walls for sharply modifying the direction of flow of air through said passage for precipitating substance in suspension in said passage whereby the conveyor may operate upon the precipitated material for removal thereof from proximity to said air passage and air may be discharged from said passage independently of the movement of the precipitated material.

In testimony whereof, I have hereunto subscribed my name this 7th day of March, 1921.

SIGMUND SCHIFF.